(12) United States Patent
Antanouski

(10) Patent No.: US 7,657,063 B2
(45) Date of Patent: Feb. 2, 2010

(54) METHOD OF RADIOACTIVE OBJECT AND NUCLEAR MATERIAL IDENTIFICATION

(76) Inventor: Aliaksandr Alexeevich Antanouski, Scoriny Avenue, 69-11 Minsk (BY) 220013

(*) Notice: Subject to any disclaimer, the term of this patent is extended or adjusted under 35 U.S.C. 154(b) by 688 days.

(21) Appl. No.: 11/583,681

(22) Filed: Oct. 19, 2006

(65) Prior Publication Data

US 2007/0092116 A1    Apr. 26, 2007

(51) Int. Cl.
*G06K 9/00* (2006.01)
*G01V 3/00* (2006.01)

(52) U.S. Cl. .............. 382/103; 382/165; 340/853.2

(58) Field of Classification Search ........... 382/100, 382/103, 107, 162, 165, 168, 181, 189, 194, 382/206, 232, 256, 274, 276, 291, 305, 312; 378/57; 705/1; 400/88; 235/462.14; 340/568.1, 340/539.26, 853.2
See application file for complete search history.

(56) References Cited

U.S. PATENT DOCUMENTS

| | | | | |
|---|---|---|---|---|
| 5,600,303 A | * | 2/1997 | Husseiny et al. | 340/568.1 |
| 5,642,393 A | * | 6/1997 | Krug et al. | 378/57 |
| 6,014,628 A | * | 1/2000 | Kovarik, Jr. | 705/1 |
| 6,965,314 B2 | * | 11/2005 | Bohinc, Jr. | 340/539.26 |
| 7,070,106 B2 | * | 7/2006 | Knowles et al. | 235/462.14 |
| 7,422,384 B2 | * | 9/2008 | Schalk et al. | 400/88 |
| 2003/0085163 A1 | | 5/2003 | Abraham | |

\* cited by examiner

*Primary Examiner*—Seyed Azarian
(74) *Attorney, Agent, or Firm*—Bardmesser Law Group

(57) ABSTRACT

The invention belongs to the field of remote object identification based on passive and/or active radiation, namely, to systems for to identifying radioactive objects, including concealed ones. A mobile and yet highly-efficient object detection and identification system detects gamma, X-ray and neutron radiation. A distributed multilevel system for a departmental (restricted) use, as well as an open system for common use, is proposed.

The expert system is designed to be multilevel. At a low level, the capacity of the portable computer sensor of the expert system is used; at a higher level, functioning of the local network of the expert system through communication links is implemented; and the next level represents the global specialized expert system performance in real time. The transfer from a lower level to a higher level takes place in the case of radioactive object identification failure or ambiguity.

6 Claims, 1 Drawing Sheet

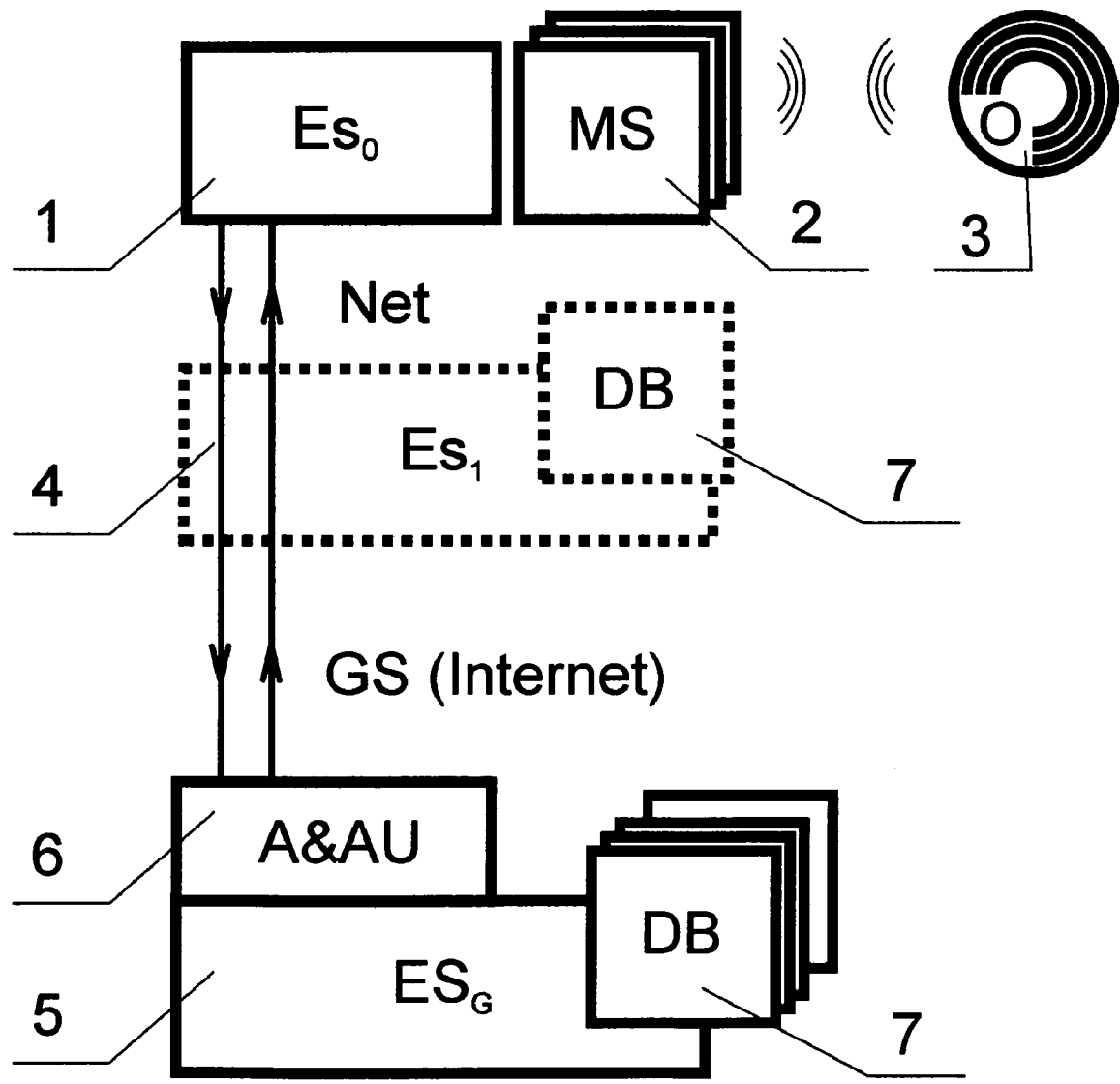

METHOD OF RADIOACTIVE OBJECT AND NUCLEAR MATERIAL IDENTIFICATION

FIELD OF THE INVENTION

The invention belongs to the field of remote objects identification through its passive and/or active radiation, namely, to systems allowing identification of radioactive objects, including concealed objects.

BACKGROUND ART

Los-Alamos National Laboratory has designed a handheld radiation semiconductor detector using Cadmium-Zink-Tellurium (CZT spectrometer) with the ability of identifying gamma radiation emitted by radioactive materials. See X-Ray and Gamma Ray Detector High Resolution CZT Cadmium Zink Telluride", www.amptek.com, Apr. 11, 2001; Charge Trapping in XR-100T-CZT Detectors Application Note", www.amptek.com, Apr. 18, 2001.

In real time, this device produces accurate data for a portable device that is insensitive to temperature changes in the environment. The detector includes a CZT chip installed in the same housing as a charge-sensitive amplifier, and an input-output unit for spectrum analysis, as well as a multi-channel analyzer with a microcontroller. Specialized software linking to the built-in microcontroller and monitoring the CZT spectrometer operations is used.

However, one of the disadvantages of the conventional instrument is the placement of the gamma and X-ray detector in the same housing as a pocketsize computer. This does not allow for control of several sensing devices. The other drawback is that only specialists possessing specific knowledge of the field can use this hand-held radiation detector.

A conventional system of remote radiation control and object identification is known, see Russian Federation Patent on Utility Model # 31001, G 01 T1/167, 2003. The system contains a stationary detection system of fissionable and radioactive materials, connected through a communications channel to a personal computer having a display device, and an information and signaling recording system, with the capacity of information transfer by means of an information channel. The personal computer is also supplied with a video-system device connected to a video images synchronization device and to a fissionable and radioactive material readings recorder with a timer.

The problems of this system are due to its stationary state, i.e., only the objects passing through the window of the stationary system can be checked, and it is impossible for an authorized person to leave his place of observation, as no system control would be performed. Moreover, the conventional system is closed and does not permit the use of additional resources and simultaneous work with different types of detectors. Only trained personnel can operate the conventional system.

DETAILED DESCRIPTION OF THE INVENTION

An object of the invention under consideration is to develop a mobile and yet highly efficient object detection and identification system using passive and/or active radiation. Another object of the proposed invention is to make it possible to create a distributed multilevel system for a departmental (closed) use as well as an open system for common use.

The problem is solved as follows: the proposed system of object identification using its passive and/or active radiation includes a remote detection unit and a data processing unit making a decision based on the results of processing by the expert system. The expert system is designed to be multilevel. At a low level, the capacity of the portable computer sensor of the expert system is used; at a higher level—functioning of the local network of the expert system through communication links is implemented; and the next level represents a global specialized expert system performing in real time. The transfer from a lower level to a higher level takes place in the case of object identification ambiguity.

The problem is solved as follows: the resources of the global specialized expert system require payment. Part of the money received for the use of the global specialized expert system is transferred to update and enlarge databases and to the object identification specialists on the payroll.

The problem is also solved as follows: the resources of the global specialized expert system are to represent updated databases of objects having been successfully identified.

Application of the method of object identification by using the expert system divided into separate levels that are interconnected through the communication links allows receiving implicit advantages, such as object identification in the place where the object is located, irrespective of the place of identification, object complexity and qualifications of an expert. Moreover, the local network allows control over all authorized experts operations from one location, to automatically file and record all actions. In every specific situation, due to the connection of the previously set expert system, data processing capabilities increase considerably. One principal archive file is sufficient to serve all preprocessing devices. This allows updating and amending databases simultaneously for all users. Use of the global specialized expert system allows concentrating finances on supporting a large object identification data bank and paying highly qualified specialists.

The invention is illustrated by drawings.

Version of Method Use Presents in Figure

The drawing schematically illustrates a system of object identification in accordance with the invention.

A method of object identification according to their characteristics is carried out with the help of the expert system of zero (initial) level ES0 (1), installed in a portable computer sharing the same housing with a microprocessor sensor MS (2). In order to register different types of object characteristics (3), MS (2) is made interchangeable. The second level of the system represents the expert system of higher rank ES1(4) installed in a personal computer. It is connected to all the portable computers performing object identification in the local network. The next level is the global specialized expert system located in the Internet ESG (5) and operated by the experts in the field of radioactive object identification. The authorized expert system users finance functioning of the proposed global system. For this reason, global specialized expert system ESG (5) has authorization and accounting unit (6), which ensures users pay access to the global expert system and the opportunity to make payments for using the expert system as well. All the systems are provided with data banks and knowledge bases (7).

The system operates in the following way.

With the help of microprocessor sensor MS (2) connected to a mobile computer with installed the expert system of initial level ES0 (1), a user (not shown) defines characteristics of identified object (3). Based on the accumulated scintillation spectra of object (3), the expert system of initial level ES0 (1), using the built-in software and databases, identifies the object and transfers the results to the indicator. Depending on the required characteristics of the object, the operator may change microprocessor sensor MS (2) and the appropriate software.

The principal instrument in the object identification process is an installed multi-channel analyzer. The final result of its work is a histogram (spectrum) of the registered pulses sorted by their amplitude. The spectrum of pulses' amplitude represents a direct reflection of the energy spectrum of gamma quanta and is the basis of identification of different isotopes.

Identification represents an analysis for verification of the investigated isotope by its radiation. The fact that the radiation emitted by each isotope is unique, allows giving its accurate identification. Methods of the identification can be divided into active and passive. This depends on the source of radiation, i.e., the substance itself or an external source.

The expert system of the initial level ES0 (1) produces the results only in the case of accurate identification with the preliminary set probability. If the given probability does not reach a predetermined value, the expert system ES0 (1) of the initial level is automatically connected to the local network; that allows using a much larger database of the stationary expert system of higher level (4). Due to the expertise of the personnel operating the expert system at this level, the probability of object identification increases to a greater extent.

If the object identification by stationary expert system (4) is still difficult, a global specialized expert system (5) is connected automatically. The global specialized expert system (5) is located, of the appointed Internet website and represents specialized constantly updated databases and knowledge bases (7). The global expert system is designed as a decision support system and includes of two parts: databases and other information on additional capabilities of the devices, and databases on rules, laws, regulations, etc., allowing an authorized person to make an independent decision or directly consult an expert operating on-line higher up in the system hierarchy. A user can be automatically referred to the decision support system in situations when the capability of his detection unit is limited or the memory of the unit lacks the required instructions, data, etc., or in a situation when the operator needs assistance in making a proper decision at user's request.

In order to perform radiation control operations by the users without specific knowledge in this area, manuals on determining a further order of actions taken by the user in every specific situation can be provided. However, this approach has its drawbacks. One of them is that a user, unknowingly or deliberately, may ignore the given instructions. The second one is that the instructions can be many volumes, which cannot be easily taken on location.

Due to the proposed method, these two disadvantages can be avoided. All actions of the user such as taking measurements, steps in decision-making, etc., are automatically registered and saved in the system. In doing so, both accuracy and competence of the operators can be verified. At the same time, any amount of step-by-step instructions can be entered in the memory of the device or can be transferred through communication links from the crisis center on request.

In fact, the method of remote object identification allows designing a unique device containing an unlimited number of independent remote detection units and a communication unit connected to a powerful processing unit located on the Internet. Any territory and any appearance or physical movement of the source of radiation can be automatically monitored by the system. Specialists of different governmental services can be equipped with portable devices having access to the expert system. The devices can work autonomously and be installed at the presumed places of the sources of radiation. The system may include other devices, for instance, portal stationary monitors, devices for monitoring the environment, etc. In doing so, all the data are filed and transferred to the decision support system.

Usage of the multilevel expert system and the Internet for the open expert system allows its users to save a considerable amount of money on the system installation in the controlled zones. In this case, a user purchases only portable computers with the detection units and can then use computing resources in the common user network. In doing so, the global expert system may operate on a commercial basis.

Thus, use of all features and characteristics allows to solve the set problem, i.e., to develop a mobile and yet highly-efficient objects registration and identification system.

The invention claimed is:

1. A system for identification of a radiation source, the system comprising:
   a portable detection unit that detects ionizing radiation from the radiation source and provides a corresponding detection signal,
   wherein the detected ionizing radiation includes gamma, neutron and X-ray radiation;
   a multi-channel analyzer, including a microprocessor, that analyzes the detection signal and generates a spectrum of the ionizing radiation; and
   means for connecting the system to a network and for communicating the spectrum to a remote expert system;
   wherein, if the microprocessor is unable to unambiguously identify a radioisotope of the radiation source, the system requests information from an expert system at a higher level in a hierarchy, and
   wherein the hierarchy includes at least two higher levels, including a first expert system located on a local area network, and a second expert system located on a global network.

2. The system of claim 1, wherein the first expert system includes a database of radioisotope spectra for use in identifying the isotopes, and wherein the database is available to a user of the system.

3. The system of claim 1, wherein accessing at least one of the expert systems requires a payment for its use.

4. A method for identification of a radiation source, the method comprising:
   using a portable detection unit, detecting ionizing radiation from the radiation source and provides a corresponding detection signal,
   wherein the detected ionizing radiation includes gamma, neutron and X-ray radiation;
   using a multi-channel analyzer that includes a microprocessor, analyzing the detection signal and generating a spectrum of the ionizing radiation; and
   connecting the system to a network and for communicating the spectrum to a remote expert system;
   wherein, if the microprocessor is unable to unambiguously identify a radioisotope of the radiation source, requesting information from an expert system at a higher level in a hierarchy, and
   wherein the hierarchy includes at least two higher levels, including a first expert system located on a local area network, and a second expert system located on a global network.

5. The method of claim 4, wherein the first expert system includes a database of radioisotope spectra for use in identifying the isotopes, and wherein the database is available to a user of the system.

6. The method of claim 4, further comprising providing payment for accessing at least one of the expert systems.

* * * * *